United States Patent [19]
Siukola et al.

[11] Patent Number: 5,962,063
[45] Date of Patent: Oct. 5, 1999

[54] PROCESS FOR PREPARATION OF A CRUMB

[75] Inventors: Taina Siukola; Maire Pylkkänen, both of Helsinki, Finland; Tammy Pepper, Weybridge, United Kingdom

[73] Assignee: Xyrofin Oy, Helsinki, Finland

[21] Appl. No.: 08/552,504

[22] Filed: Nov. 9, 1995

[51] Int. Cl.$^6$ .................................................. A23G 1/00
[52] U.S. Cl. ..................... 426/631; 426/548; 426/658; 426/660
[58] Field of Search .................................. 426/548, 658, 426/660, 285, 454, 520, 615, 631, 659

[56] References Cited

U.S. PATENT DOCUMENTS

| | | | |
|---|---|---|---|
| 3,622,342 | 11/1971 | Rusoff | 426/658 |
| 4,084,011 | 4/1978 | Chevalley et al. | 426/580 |
| 4,980,189 | 12/1990 | Keme et al. | 426/548 |
| 5,098,730 | 3/1992 | Pepper et al. | 426/548 |

FOREIGN PATENT DOCUMENTS

| | | |
|---|---|---|
| 0 317 917 | 11/1989 | European Pat. Off. |
| 0 512 910 | 11/1992 | European Pat. Off. |
| 80/01869 | 9/1980 | WIPO |
| 90/06317 | 6/1990 | WIPO |
| 92/19112 | 11/1992 | WIPO |

*Primary Examiner*—Leslie Wong
*Attorney, Agent, or Firm*—Scully, Scott, Murphy & Presser

[57] ABSTRACT

A process for the preparation of a solid granular intermediate useful in chocolate production. In this process, a mixture comprising a bulk sweetener, milk material, cocoa liquor and water is stirred into a homogeneous mass, the mass is warmed with simultaneous kneading and subjected to a vacuum for removing water, and the kneading is continued under vacuum until crystallization of the mass takes place. The bulk sweetener consists mainly of a sugar alcohol, and the temperature of the mass is controlled so that at least a part of the bulk sweetener is present in solid state during the vacuum kneading. Also, the use of a product produced by the process for preparing chocolate, beverage or confectionery fillings.

24 Claims, No Drawings

5,962,063

PROCESS FOR PREPARATION OF A CRUMB

BACKGROUND OF THE INVENTION

The present invention relates to a process for the preparation of a solid granular intermediate (commonly known in the field of chocolate production as milk or chocolate crumb) useful in the production of milk chocolate, using a bulk sweetener suitable for diabetics, dentally safe and/or having a reduced caloric content. A bulk sweetener refers to a sweetener that, in a composition, has an effect essentially similar to that of sucrose, i.e. it provides both sweetness and bulk to the composition.

Milk chocolate is produced primarily by two different methods. In the most commonly used method, a base mass is formed of the chocolate raw materials (sweetener, milk powder, cocoa liquor and part of the cocoa butter) by mixing and kneading them into a homogeneous, plastic mass. This base mass is processed further by roller refining, the main purpose of which is to diminish the particle size, thereafter by mechanical heat treatment, i.e. conching prior to or during which the remainder of the cocoa butter and the possible emulsifiers, flavours and intense sweeteners are added. During the conching the final taste of the chocolate is produced and the desired consistency of the mass is achieved. In conventional chocolate manufacture with sucrose as sweetener, according to e.g. *Ullmanns Enzyklopädie der technischen Chemie*, 4th Edition, Volume 20, Verlag Chemie, Weinheim, 1981, pp. 682–686, the temperature during the conching can rise up to 80° C.; in milk chocolate manufacture, however, the conching temperature should not exceed 60° C. (see for instance Lees, R. & Jackson, E. B., *Sugar Confectionery and Chocolate Manufacture*, Leonard Hill, Glasgow, 1985, p. 137). The conching is followed by tempering (pre-crystallization) and forming into a final chocolate product.

In another method, a solid prefabricate, i.e. crumb, is produced from the sweetener, milk (from which part of the water has been evaporated) or milk powder and water and cocoa liquor or part of the cocoa liquor and part of the fat (milk fat and/or cocoa butter) by heating with simultaneous stirring and removing the water contained in the mass in a vacuum, for instance in a vacuum mixer. The product so obtained, the particle size of which varies within a broad range, is refined by milling to a product with a homogeneous particle size. Also in this process the further treatment steps are in principle the same as with the base mass discussed above, that is, the roller refining and conching, prior to and/or during which the remainder of the cocoa liquor and fat and the possible emulsifiers, flavours and intense sweeteners are added, and finally tempering and forming into the desired chocolate product.

These basic processes and the effect of their different steps on the properties of the final product have been described for instance in Minifie, B. W., *Chocolate, Cocoa and Confectionery*, 2nd Edition, The AVI Publishing Company, Inc., Westport, Conn., 1982, pp. 107–125, and in *Ullmanns Enzyklopädie der technischen Chemie*, 4th Edition, Volume 20, Verlag Chemie, Weinheim, 1981, pp. 682–686.

The most important advantage achieved with the crumb process is the pleasant taste of chocolate produced by this process, which taste is a result of the so-called non-enzymatic browning and caramelization reaction, i.e. Maillard reaction, which takes place during the production of crumb. Aromas that significantly affect the taste of the final chocolate are formed in this reaction. A condition for the occurrence of this reaction is, according to e.g. the above publication by Lees & Jackson, p. 126, that both milk solids and sucrose are present. An additional advantage achieved with the crumb process is that the crumb serves as a basis having a uniform quality for milk chocolate production and has good shelf life, wherefore it can be stored for long periods.

In the manufacture of chocolates that are suitable for diabetics, are dentally safe and/or have a reduced caloric content, fructose or sugar alcohols, such as lactitol, isomalt, maltitol, mannitol, sorbitol and/or xylitol, are most often used as sweeteners. Sugar alcohols however lack the carbonyl group typical to sugars, wherefore they do not participate in the Maillard reaction.

It is also desirable to develop the pleasant taste typical of conventional sucrose chocolates produced by the crumb method when the bulk sweetener is a sugar alcohol. Naturally, the good storability of crumb is a considerable advantage also in these cases.

The use of sugar alcohols as sweeteners in chocolate has been mentioned for example in Finnish Patent Application 922030 (maltitol, lactitol and hydrogenated isomaltulose mentioned as sugar alcohols for the sweetener), WO published application No. 90/06317 (sweetener lactitol monohydrate), U.S. Pat. No. 5,098,730 (sweetener xylitol), WO published application No. 80/01869 and European Patent 0 317 917. Most of these publications relate to processes in which the base mass for chocolate is produced by mixing and kneading the ingredients.

WO published application No. 80/01869 discloses a modified process for preparing crumb products, and sugar alcohols such as sorbitol or xylitol have been mentioned as possible sugar materials to be used as sweeteners. In this process, separate flows of the raw materials are formed, and one of the flows containing milk products and optionally sugar raw materials, amino acids and reducing sugars is subjected to a temperature of 100–130° C. for performing a Maillard reaction. Subsequently this flow is cooled and, at a temperature of 65–75° C., homogenized with a second flow containing fat components and an emulsifier to form an aqueous emulsion. For obtaining a dry crumb product, said emulsion can be dried in a spray drier. In all, the disclosed process is rather complicated and requires special equipments.

European Patent 0 317 917 relates to chocolate production by the crumb method, employing a sweetener substituting sugar. This publication discloses as examples of such sweeteners sugar alcohols, such as sorbitol, mannitol, maltitol, lactitol, xylitol and Palatinit®, etc., the dentally safe disaccharide Palatinos®, leucrose and polydextrose as well as mixtures thereof. In this publication, the fact that these sweeteners required the use of relatively low conching temperatures (40–50° C.) and hence long conching times, with the resultant tendency of the chocolate mass to absorption of atmospheric moisture and/or release of crystal water with consequent undesirable increase in viscosity, and/or agglomeration of the mass, are mentioned as disadvantages associated previously with the use of said sweeteners. These disadvantages are said to be avoided by the process in accordance with the publication, in which the conching temperature is within the range 55–85° C.

The starting temperature in the production of a crumb is normally within the range 90–100° C. when sucrose is used as the sweetener. European Patent 0 317 917 mentions 50–140° C. as the starting temperature in crumb production. In all examples of this patent, the ingredients of the crumb are first heated to 94° C., i.e. to a temperature typically used with sucrose.

Experiments were carried out by the inventors of the present invention on the suitability of lactitol monohydrate in conventional crumb production, the ingredients of the crumb were first heated to 90–95° C. However, the desired crumb product was not obtained, but during the vacuum step a tough mass was produced instead of a dry granular crumb, and this mass was set when cooled into a product of the type of hard candy, and was totally unfit for use in chocolate production. The desired product was not obtained despite repeated experiments. Furthermore, an attempt was made to prepare a crumb from lactitol dihydrate by the conventional crumb production method. However, an unusable, hard-candy like product was obtained also in this case instead of a crystalline crumb.

SUMMARY OF THE INVENTION

The object of the present invention is therefore generally a process for developing a crumb useful in chocolate production using as the bulk sweetener sugar alcohols, so that the resultant crumb will produce, in the chocolate or other final product prepared from it, a caramelized flavour which is typical of sucrose chocolates prepared by the crumb method, the process also being suitable for sugar alcohols which have a relatively low melting point.

These objects are achieved with the process of the invention, which is based on the discovery that the control of the temperature during the formation of the crumb is critical for obtaining a crumb useful in the production of chocolate. It was found that if all of the bulk sweetener was dissolved and/or melted during the procedure, no useful crumb was achieved.

Accordingly, the present invention provides a process for preparing a crumb useful in chocolate production, wherein a mixture comprising milk material, cocoa liquor, water and a bulk sweetener consisting mainly of a sugar alcohol is stirred into a homogeneous mass, the mass is kneaded with simultaneous warming and, after the desired temperature is achieved, the mass is subjected to a vacuum for removing water, and the kneading is continued under vacuum until crystallization of the mass takes place, whereby the temperature of the mass is controlled so that at least part of the bulk sweetener is present in solid state during the kneading under vacuum.

The invention also relates to the use of a product produced by the process of the present invention for preparing chocolate, beverage or confectionery fillings.

DETAILED DESCRIPTION OF THE INVENTION

In order to ensure the presence of some bulk sweetener in solid state, a portion of crystalline sweetener may be added to the mass as seed crystals during the vacuum kneading. If necessary, the vacuum kneading may be interrupted for the time of addition of the seed crystals. Even at the time of such an addition, the temperature of the mass must be controlled so that the seed crystals do not melt.

A temperature as high as possible is selected as the heating temperature at the beginning of crumb production for the sake of aroma formation, and thus the lactose contained in the milk material used as an ingredient will participate in the Maillard reaction stated above. A high initial temperature is also necessary in order to remove water from the mass as quickly as possible during the process. However, the temperature must be selected taking into account the above aspects.

When the mass is subjected to a vacuum, its temperature decreases. In that case, it may be necessary to warm the mass in order to assure its uniform boiling to remove water.

On the other hand, heat is liberated when the crystallization begins, and the mass must be externally cooled if necessary for controlling the temperature.

The bulk sweetener used in the process of the invention consists mainly of a sugar alcohol, preferably selected from lactitol, sorbitol and xylitol.

Lactitol is a preferred sweetener for use in the process according to the invention, since its energy content is only about half of that of sucrose, and it does not increase the blood glucose content; it is furthermore safe for teeth. It may occur as an anhydride, monohydrate or dihydrate and various admixtures of these. Crystalline lactitol monohydrate is especially preferable on account of its low hygroscopicity. Its preparation has been disclosed in WO Patent Application 90/06317.

In a preferred embodiment of the invention, the sweetener comprises at least about 95% by weight of lactitol monohydrate, and the mass is heated to a maximum temperature of about 90° C., preferably to a temperature within the range 75–85° C. and most preferably to 80–85° C. If seed crystals of lactitol monohydrate are added during the vacuum kneading, the mass may initially be heated to a maximum temperature of 90–95° C. Fructose and xylose are preferred for use along with lactitol monohydrate.

The process of the invention employs conventional crumb-manufacturing methods and conditions, except for the control of the temperature as stated above. Special attention must be paid to the temperature control in cases where the sweetener comprises a mixture of two or more sugars and/or sugar alcohols, since the melting temperatures of such mixtures are lower than those of the components of the mixture.

In the process of the invention, the starting mixture may comprise 40–70, preferably about 55 parts by weight of the sweetener, 5–10, preferably about 8 parts by weight of cocoa liquor, 20–35, preferably 27–28 parts by weight of milk solids other than fat, 5–15, preferably 9–10 parts by weight of fat and 8–15% by weight, preferably about 10% by weight of water calculated on the total amount of the mixture.

Chocolate can be manufactured from the crumb produced in accordance with the invention by conventional methods, comprising addition of fat and/or a fat-replacing ingredient and other desired ingredients such as polydextrose (light chocolates), and roller refining, conching, tempering and forming steps. Conching can be carried out at temperatures usually employed in the manufacture of sucrose milk chocolate, e.g. at about 60° C., without any problems.

Intense sweeteners may be used along with the above sucrose-replacing bulk sweeteners, and they are often employed particularly in combination with lactitol. If a heat stable sweetener, e.g. acesulfame K, saccharin or cyclamate is used, it may be added at any stage in the process. If a heat labile sweetener, e.g. aspartame is used, it is added towards the end of conching.

The invention will be illustrated more closely by means of the following examples that are not intended to restrict the scope of the invention. The significance of the heating temperature is shown by the reference examples, in which the temperature control was insufficient. In addition, a crumb with sucrose as the sweetener was prepared in Reference Example 3 for comparison.

All water contents given in the examples and reference examples include the crystal water possibly present in the product.

Reference Example A

An attempt was made to prepare a crumb containing crystalline lactitol monohydrate (manufacturer Xyrofin) as the sweetener using the following raw materials:

| Ingredients | % of fresh weight |
| --- | --- |
| Crystalline lactitol monohydrate | 55.0 |
| Cocoa liquor | 8.0 |
| Milk powder (26% fat) | 37.0 |

Water was added in an amount of 10% by weight on the total amount of the mixture. The total amount of the mixture was 1 kg.

The above proportions of the sweetener, cocoa liquor, milk powder and water correspond to those disclosed in Lees, R. & Jackson, E. B., *Sugar Confectionery and Chocolate Manufacture*, Leonard Hill, Glasgow, 1985, pp. 126–128.

The water was measured into a Herman Linden Z blade mixer provided with a water/steam heated jacket and a vacuum pump. The lactitol monohydrate, cocoa liquor and milk powder were stirred well together and added into the mixer. The mixer was started and the mass kneaded, simultaneously conveying hot steam into the jacket of the mixer. The jacket was heated with steam until the mass was brought to a temperature of 90–95° C. The feeding of steam was discontinued, the vacuum pump started, and the pressure gradually lowered to a vacuum of approx. 1 bar. The kneading was continued in the vacuum. However, the mass was not crystallized, but the result was a molten viscous product. Not even the addition of ground lactitol (crystal seeds) in the final stage of the kneading produced the desired crystallization. The reason for this was insufficient control of the temperature, i.e. the temperature of the mass was higher than the melting point of the seed crystals. After cooling, the mass hardened into a hard-candy like product having a water content of 4.8%.

EXAMPLE 1

The procedure of Reference Example A was repeated, except that the raw materials were heated to 80–85° C. prior to the starting of the vacuum pump. The kneading was continued in the vacuum, and crystallization started after 30 minutes. A crystalline crumb with a water content of 5.2% was thus obtained.

Reference Example B

The procedure of Reference Example A was repeated, except that sucrose (manufacturer Sucros Oy) was used as the sweetener instead of lactitol monohydrate and the raw materials were heated to 90–95° C. A crystalline crumb having a final water content of 2.3% was formed during the process.

Reference Example C

The purpose was to repeat the procedure of Reference Example A using a mixture comprising 98% by weight of lactitol monohydrate (Xyrofin) and 2% by weight of fructose as a sweetener instead of lactitol monohydrate. The temperature control of the mass, however, was insufficient. The mass was heated to a temperature of 85° C. and the vacuum pump started, as a result of which the temperature fell to 55° C. Steam was conveyed into the jacket of the mixer to heat the mass. Then, however, the temperature of the mass rose over 90° C., and no crystallization took place.

EXAMPLE 2

The procedure of Reference Example C was repeated, with closer control of the temperature. The mass was heated to 85° C. and the vacuum pump started. During the vacuum the temperature was not allowed to fall below 65° C. (steam was conveyed into the jacket as necessary). When the crystallization started, the temperature rose without external heating to 75° C. on account of the heat liberated in the crystallization, and fell again after the crystallization step. The crystalline crumb formed had a final water content of 2.0%.

EXAMPLE 3

The procedure of Reference Example A was repeated, except that a lactitol anhydride having a water content of 1.4% and a melting range of 125–145° C. was employed instead of lactitol monohydrate. This gave a crystallized crumb with a final water content of 4.8%.

EXAMPLE 4

The procedure of the preceding examples was followed using a lactitol anhydride having a water content of 1.8% and a melting range of 125–151° C. as the sweetener. The temperature of the mass was first raised to 95° C. The temperature fell under vacuum to 65° C. at its lowest, rose during the crystallization to 80° C., and fell again after the crystallization. The result was a crystalline crumb with a water content of 2.0%.

Reference Example D

The purpose was to prepare a crumb in accordance with the preceding examples using lactitol dihydrate as the sweetener.

The sweetener used in this example was a commercial "dihydrate" product, Lacty LA 517 B (manufacturer Purac), having a water content of 8.5% as analysed. Since the water content of lactitol dihydrate is 9.74% and that of monohydrate 4.97%, this analysis result means that the product used was a mixture of different crystal forms (dihydrate, monohydrate and anhydride). The melting point of pure lactitol dihydrate is 70–72° C. The melting range of the product was 80–100° C.

The mass was first warmed to 85° C., whereafter the vacuum pump was started. During the mixing in vacuum, the temperature first remained at 61–63° C., started to rise after about 25 minutes, and rose in 15 minutes to about 70° C. However, the mass did not crystallize. The water content of the product was 4.3%.

Reference Example E

The procedure of the preceding examples was followed and an amount of 1.5 kg of mass was prepared with a 80:20 mixture of lactitol monohydrate and xylitol (manufacturer Xyrofin) as the sweetener. The mass was first heated to a temperature of 85° C. and the vacuum pump started. When the temperature of the mass fell below 65° C., the jacket of the mixer was heated with steam, as a result of which the temperature rose to 68° C. Mixing was continued in a vacuum of 0.8 bar during about one hour, but the mass was not crystallized. The final water content of the mass was 7.5%.

The vacuum of 0.8 bar produced in the mixer was obviously insufficient to remove water from the 1.5 kg mass.

Reference Example F

The procedure of Reference Example E was repeated with 1 kg of mass. The vacuum during the vacuum mixing step was 0.9 bar, and the mixing was continued for about one hour. The mass dried but was not crystallized. It had a final water content of 4.5%.

Reference Example G

The procedure of the preceding examples was repeated with an amount of 1 kg of mass containing xylitol (Xyrofin) as the sweetener. The mass was first heated to a temperature of 80° C. It melted and was not crystallized. The final water content was 4.1%.

EXAMPLE 5

The procedure of the preceding examples was repeated with xylitol (Xyrofin) as the sweetener. The mass was first heated to a temperature of 75° C. During the vacuum kneading the temperature was 56–60° C. Crystallization started after 70 minutes and resulted in a crystalline crumb with a water content of 4.5%.

EXAMPLE 6

Lactitol monohydrate (Xyrofin) was used as the sweetener in this example. The procedure was begun as in the preceding examples. The mass was first heated to a temperature of 90–95° C., and the vacuum pump was started. When most of the water was removed from the mass, the vacuum pump was stopped and milled lactitol monohydrate (10% of the original weight of the mass) was added at a temperature of 65° C. The vacuum pump was started again, and crystallization started after 20 minutes. The final water content of the crumb was about 4%.

Reference Example H

The procedure of Reference Example A was mainly followed using as the sweetener a commercial lactitol dehydrate product LC-2 016L234, manufacturer Towa, except that no seed crystals were added. The water content of the sweetener was 9.9%. The weight of the mass was 900 g. Milk powder and the sweetener were mixed and the mixture was added to the kneader with water. The mixture was heated to 94° C. and cocoa liquor was added. The vacuum was started and kept on for about an hour. No crystallization took place.

EXAMPLE 7

A commercial lactitol dehydrate product LC-2 018L234, manufacturer Towa, water content 12.2%, was used as the sweetener, and the procedure of Reference Example H was repeated with the exception that the mixture was initially heated to 50° C. When the full vacuum of 0.88 bar was achieved, the temperature of the mass was 45.6° C. After that, the temperature began to rise and was after 6 minutes 47.4° C. and after 12 minutes 49.2° C. At that time, crystallization took place. The final water content of the crumb was 7.5%.

EXAMPLE 8

The procedure of Example 6 was followed using sorbitol (manufacturer Cerestar) as the sweetener. The mass was initially heated to 80° C. Milled sorbitol was added after vacuum had been on for 15 minutes. Crystallization started during the addition of the milled sorbitol. The temperature of the mass rose from 53.8° C. to 55.0° during the second vacuum stage, which lasted for 40 minutes. Slow crystallization took place during this period of time. The final water content of the crumb was 4.0%.

Examples 1 to 8 and Reference Examples A to H clearly show the importance of careful temperature control in crumb production when sugar alcohols are used as bulk sweeteners. Furthermore, the examples and reference examples show that the behaviour of sugar alcohols in crumb production significantly differs from that of sucrose, wherefore the procedure conventionally used in crumb production is not suitable to be used when a significant part of the sweetener comprises a sugar alcohol.

EXAMPLE 9

Preparation of chocolate

Bars of chocolate were prepared from the crystalline crumb products obtained above in Examples 1, 2, 3 and 4 and Reference Example B in the conventional manner. The crumb was first comminuted by milling, whereafter cocoa butter and, as an emulsifier, lecithin were gradually added thereto with simultaneous mixing. The mass so obtained was subjected to roller refining followed by an addition of cocoa butter, another roller refining, and mixing. Vanilla was added as a flavour during the last mixing step. The resultant flaky mixture was transferred to a conche, wherein the remainder of cocoa butter was added thereto. The amount of fat may be reduced, if polydextrose is added to the mass. The conching temperature was approx. 60° C. and the conching time 18 hours. Towards the end of the conching, an intense sweetener may be added to the mass if desired. After the conching, the chocolate was tempered and poured into moulds.

The chocolates obtained were pleasant in regard to sensory properties and texture, and they had the typical aroma of chocolates prepared by the crumb method.

We claim:

1. A process for the preparation of a crystalline granular crumb for use in the production of chocolate, comprising:
    (a) stirring a mixture comprising milk material, cocoa liquor, water and a bulk sweetener comprising a sugar alcohol into a homogeneous mass;
    (b) warming the mass;
    (c) subjecting the mass to vacuum under simultaneous kneading; and
    (d) continuing the kneading under vacuum until crystallization of the mass takes place;
wherein the temperature of the mass during steps (b) to (d) is controlled so that at least part of the bulk sweetener is present in the solid state during the kneading under vacuum and so that the temperature of the mass does not exceed the melting point of the bulk sweetener.

2. A process according to claim 1 wherein the sweetener is selected from the group consisting of lactitol, xylitol and sorbitol.

3. A process according to claim 2 wherein the sweetener is selected from the group consisting of lactitol monohydrate, lactitol dihydrate, lactitol anhydride and mixtures thereof.

4. A process according to claim 1 wherein the sweetener comprises at least about 95% by weight of lactitol monohydrate.

5. A process according to claim 4 wherein the sweetener is lactitol monohydrate or a mixture thereof with an intense sweetener.

6. A process according to claim 4 wherein the sweetener consists of lactitol monohydrate and fructose.

7. A process according to claim 4 wherein the sweetener consists of lactitol monohydrate and xylose.

8. A process according to claim 4 wherein the mass is warmed to a temperature of 75–85° C.

9. A process according to claim 5 wherein the mass is warmed to a temperature of 75–85° C.

10. A process according to claim 6 wherein the mass is warmed to a temperature of 75–85° C.

11. A process according to claim 7 wherein the mass is warmed to a temperature of 75–85° C.

12. A process according to claim 4 wherein the mass is warmed to a temperature of 85–95° C. and seed crystals of lactitol monohydrate are added to the mass during the kneading under vacuum.

13. A process according to claim 5 wherein the mass is warmed to a temperature of 85–95° C. and seed crystals of lactitol monohydrate are added to the mass during the kneading under vacuum.

14. A process according to claim 6 wherein the mass is warmed to a temperature of 85–95° C. and seed crystals of lactitol monohydrate are added to the mass during the kneading under vacuum.

15. A process according to claim 7 wherein the mass is warmed to a temperature of 85–95° C. and seed crystals of lactitol monohydrate are added to the mass during the kneading under vacuum.

16. A process according to claim 3 wherein the sweetener comprises lactitol dihydrate and the mass is warmed to a temperature of about 50° C.

17. A process according to claim 2 wherein the sweetener mainly consists of xylitol.

18. A process according to claim 2 wherein the sweetener mainly consists of sorbitol.

19. A process according to claim 1 wherein the mass is controlledly warmed during the vacuum so that the boiling of the mass is continuous.

20. A process according to claim 1 or 2 wherein the mixture comprises 40–70 parts by weight of the sweetener, 5–10 parts by weight of cocoa liquor, 20–35 parts by weight of milk solids other than fat, 5–15 parts by weight of fat and 8–15% by weight of water calculated on the total amount of the mixture.

21. A process according to claim 20 wherein the fat is milk fat, cocoa butter or a mixture of these.

22. A process according to claim 2 wherein the sweetener is in a mixture with an intense sweetener.

23. A process according to claim 3 wherein the sweetener is in a mixture with an intense sweetener.

24. A process according to claim 1 or 2 wherein the mixture comprises about 55 parts by weight of the sweetener, about 8 parts by weight of cocoa liquor, 27–28 parts by weight of milk solids other than fat, 9–10 parts by weight of fat and about 10% by weight of water calculated on the total amount of the mixture.

* * * * *